(12) United States Patent
Yu et al.

(10) Patent No.: US 10,425,823 B2
(45) Date of Patent: Sep. 24, 2019

(54) CELL MANAGEMENT APPARATUS AND METHOD FOR OPERATING CELL MANAGEMENT APPARATUS

(71) Applicants: SK TELECOM CO., LTD., Seoul (KR); INDUSTRY-ACADEMIC COOPERATION FOUNDATION, YONSEI UNIVERSITY, Seoul (KR)

(72) Inventors: Tak Ki Yu, Yongin-si (KR); Young Lak Kim, Yongin-si (KR); Sung Ho Moon, Anyang-si (KR); Tae Guen Kim, Seongnam-si (KR); Min Soo Na, Seongnam-si (KR); Soo Yong Choi, Seoul (KR); Tae Hyung Kim, Incheon (KR); Kyung Sik Min, Seoul (KR)

(73) Assignees: SK TELECOM CO., LTD., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 170 days.

(21) Appl. No.: 15/500,783

(22) PCT Filed: Jun. 26, 2015

(86) PCT No.: PCT/KR2015/006567
§ 371 (c)(1),
(2) Date: Jan. 31, 2017

(87) PCT Pub. No.: WO2016/017934
PCT Pub. Date: Feb. 4, 2016

(65) Prior Publication Data
US 2017/0223547 A1    Aug. 3, 2017

(30) Foreign Application Priority Data

Jul. 31, 2014 (KR) .................. 10-2014-0098198

(51) Int. Cl.
*H04W 16/04* (2009.01)
*H04W 16/32* (2009.01)

(52) U.S. Cl.
CPC .......... *H04W 16/04* (2013.01); *H04W 16/32* (2013.01)

(58) Field of Classification Search
CPC ..... H04W 16/04; H04W 16/32; H04W 16/22; H04W 16/18; H04W 28/16; H04W 72/12;
(Continued)

(56) References Cited

U.S. PATENT DOCUMENTS

| 2010/0248730 | A1* | 9/2010 | Han | H04W 16/10 455/450 |
| 2012/0307750 | A1* | 12/2012 | Hunukumbure | H04W 16/02 370/329 |
| 2014/0050175 | A1* | 2/2014 | Zhang | H04W 8/26 370/329 |

FOREIGN PATENT DOCUMENTS

| KR | 10-2013-0008468 A | 1/2013 |
| KR | 10-2013-0100716 A | 9/2013 |

(Continued)

OTHER PUBLICATIONS

International Search Report dated Sep. 4, 2015 corresponding to International Application No. PCT/KR2015/006567.
(Continued)

*Primary Examiner* — Ian N Moore
*Assistant Examiner* — Brian T Le
(74) *Attorney, Agent, or Firm* — Hauptman Ham, LLP

(57) ABSTRACT

The present invention suggests a cell management apparatus and a method for operating a cell management apparatus, capable of harmoniously satisfying effects of improving intercell interference and enhancing operation efficiency of radio resources in managing virtual cells, particularly in
(Continued)

managing virtual cells in a heterogeneous network environment in which cells having different sizes coexist.

11 Claims, 5 Drawing Sheets

(58) Field of Classification Search
CPC ....... H04W 24/00; H04W 36/14; H04W 8/02; H04W 72/04
See application file for complete search history.

(56) References Cited

FOREIGN PATENT DOCUMENTS

| KR | 10-2014-0009473 A | 1/2014 |
| KR | 10-2014-0037131 A | 3/2014 |
| KR | 10-2014-0041359 A | 4/2014 |
| WO | 2012/145919 A1 | 11/2012 |

OTHER PUBLICATIONS

Chinese Office Action dated Oct. 25, 2018 for corresponding Chinese Application No. 201580039399.7.

\* cited by examiner

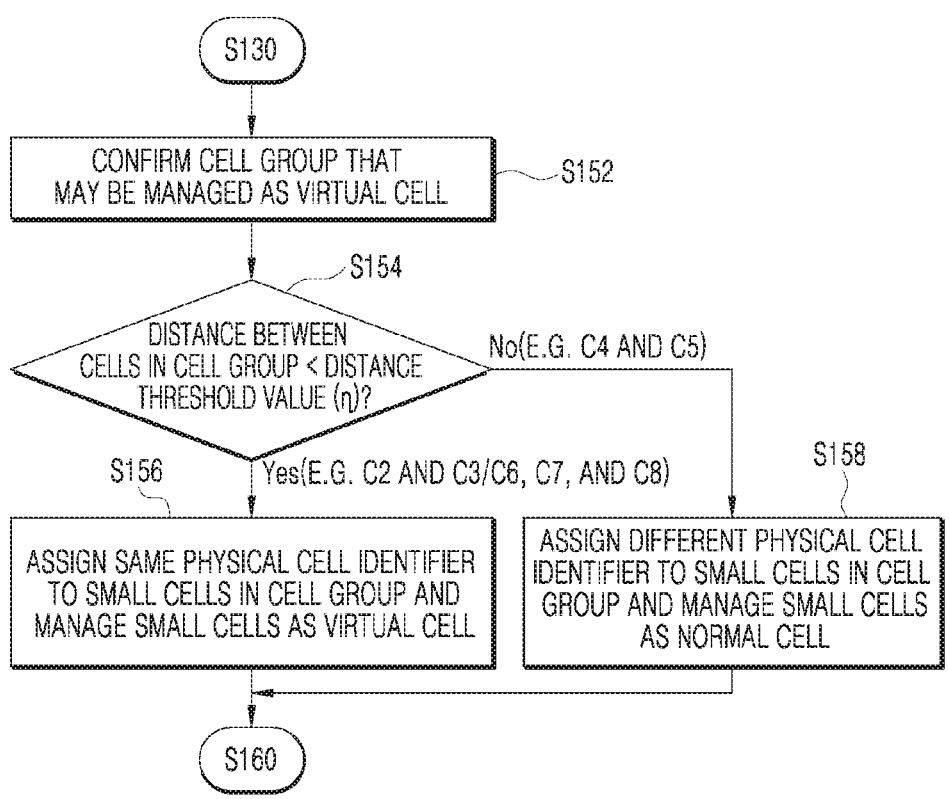

CELL MANAGEMENT APPARATUS AND METHOD FOR OPERATING CELL MANAGEMENT APPARATUS

CROSS REFERENCE TO RELATED APPLICATION

This application claims the priority of Korean Patent Application No. 10-2014-0098198, filed on Jul. 31, 2014 in the KIPO (Korean Intellectual Property Office). Further, this application is the National Phase application of International Application No. PCT/KR2015/006567 filed Jun. 26, 2015, which designates the United States and was published in Korean.

TECHNICAL FIELD

The present invention relates to a cell management apparatus and a method for operating a cell management apparatus, capable of harmoniously satisfying effects of improving intercell interference and enhancing operation efficiency of radio resources in operating virtual cells in a heterogeneous network environment in which cells having different sizes coexist.

BACKGROUND ART

Recently, an LTE-advanced (LTE-A) communication system, a high speed communication system capable of supporting wider band as compared to the existing LTE system, has newly appeared.

Transmission mode 9 (TM-9) and Transmission mode 10 (TM-10), one of functions of the LTE-A communication system, support channel state information reference signal (CSI-RS) and demodulation reference signal (DMRS), instead of cell specific reference signal (CRS) supported in TM-3 and TM-4 in the existing LTE system for channel state estimation.

In the LTE-A communication system, the CSI-RS and the DMRS supported in TM-9 and TM-10 are utilized, such that the same physical cell identifier (PCI) may be assigned to two or more adjacent cells to form one virtual cell. Thus, interference at a cell edge is improved, and a terminal may move without inter-cell handover in one virtual cell.

In the LTE-A communication system, the same physical cell identifier (PCI) is assigned to two or more cells to form one virtual cell. Therefore, regarding a terminal located in an overlapped area in which cells (for example, C2 and C3) are overlapped with each other, C2 and C3 each allocate the same radio resource to the terminal, such that the terminal is provided with the same communication service through C2 and C3 at the same time.

Meanwhile, in the LTE-A communication system, regarding terminals located in a central area of each of the cells C2 and C3, not the overlapped area, each of the cells C2 and C3 allocates separate radio resource to the terminals as in the related art, such that the terminals are provided with the communication service through C2 and C3, respectively.

However, when two or more cells are managed as one virtual cell as described above, interference at a cell edge may be improved but the effect of enhancing the operation efficiency of radio resources resulting from frequency reuse may be deteriorated, that is, a tradeoff occurs.

In particular, in a heterogeneous network environment in which cell having different sizes, that is macro cells and small cells coexist, since the small cells are newly installed and placed irregularly as needed, severe tradeoff may occur depending on environmental factors (e.g. the number of small cells, a distance between cells, an amount of traffic, etc.) of the small cells when the virtual cell is managed with respect to the small cells.

Accordingly, the present invention is to harmoniously satisfy the effects of improving intercell interference and enhancing the operation efficiency of radio resources in managing virtual cells, particularly in managing virtual cells in a heterogeneous network environment.

DISCLOSURE

Technical Problem

An object of the present invention is to provide a cell management apparatus and a method for operating a cell management apparatus, capable of harmoniously satisfying effects of improving intercell interference and enhancing operation efficiency of radio resources in managing virtual cells in a heterogeneous network environment in which cells having different sizes coexist.

Technical Solution

In one embodiment of the present invention, a cell management apparatus includes: a load confirmation unit configured to confirm overall load associated with a plurality of cells, a distance threshold value determination unit configured to determine a distance threshold value of a distance between cells in a virtual cell to be different based on the overall load, and a virtual cell management unit configured to manage two or more cells of which a distance therebetween satisfies the distance threshold value among the plurality of cells as one virtual cell, by using the determined distance threshold value.

The distance threshold value may be determined so that the smaller the overall load, the larger the distance threshold value.

The virtual cell management unit may be operated according to different virtual cell management method based on the overall load to manage two or more cells of which a distance therebetween satisfies the distance threshold value among the plurality of cells as one virtual cell.

The virtual cell management method may include a first virtual cell management method used when the overall load is a preset reference value or more, and a second virtual cell management method used when the overall load is less than the reference value.

The overall load may be confirmed to be different according to at least one of the total amount of traffic in the plurality of cells, and the total number of the plurality of cells.

When the virtual cell management unit is operated according to the first virtual cell management method, the virtual cell management unit may confirm priority based on an amount of traffic with respect to each of the plurality of cells, sequentially select a cell in an order from a cell having the highest priority to a cell having the lowest priority among the plurality of cells, and determine whether to manage the selected cell as a virtual cell based on the distance threshold value.

Priority of the each of the plurality of cells is higher as the each of the plurality of cells has a smaller amount of traffic.

When the virtual cell management unit is operated according to the second virtual cell management method, the virtual cell management unit may confirm at least one cell group that is formed in advance from the plurality of cells, and when a specific cell group in which a distance between cells is within the distance threshold value exists in the at least one cell group, manage the cells in the specific cell group as one virtual cell.

The at least one cell group may be formed in advance from the plurality of cells according to a predefined virtual cell grouping policy to be managed as a virtual cell.

In another embodiment of the present invention, a method for operating a cell management apparatus includes: a load confirmation step configured to confirm overall load associated with a plurality of cells; a distance threshold value determination step configured to determine a distance threshold value of a distance between cells in a virtual cell to be different based on the overall load; and a virtual cell management step configured to manage two or more cells of which a distance therebetween satisfies the distance threshold value among the plurality of cells as one virtual cell by using the determined distance threshold value.

The virtual cell management step is performed according to different virtual cell management method based on the overall load to manage two or more cells of which a distance therebetween satisfies the distance threshold value among the plurality of cells as one virtual cell.

The virtual cell management method may include a first virtual cell management method used when the overall load is a preset reference value or more, and a second virtual cell management method used when the overall load is less than the reference value.

The overall load may be confirmed to be different according to at least one of the total amount of traffic in the plurality of cells, and the total number of the plurality of cells.

When the virtual cell management step is performed according to the first virtual cell management method, the virtual cell management step is performed to confirm priority based on an amount of traffic with respect to the plurality of cells, sequentially select a cell in an order from a cell having the highest priority to a cell having the lowest priority among the plurality of cells, and determine whether to manage the selected cell as a virtual cell based on the distance threshold value.

When the virtual cell management step is performed according to the second virtual cell management method, the virtual cell management step is performed to confirm at least one cell group that is formed in advance from the plurality of cells, and when a specific cell group in which a distance between cells is within the distance threshold value exists in the at least one cell group, manage the cells in the specific cell group as one virtual cell.

Advantageous Effects

In the cell management apparatus and the method for operating a cell management apparatus according to an exemplary embodiment of the present invention, the effects of improving intercell interference and enhancing the operation efficiency of radio resources in managing virtual cells in a heterogeneous network environment in which cells having different sizes coexist may be harmoniously satisfied.

DESCRIPTION OF DRAWINGS

FIGS. 3 to 5 are operational flowcharts illustrating a method for operating a cell management apparatus according to an exemplary embodiment of the present disclosure.

BEST MODE

Hereinafter, an exemplary embodiment of the present invention will be described with reference to the accompanying drawings.

Figure 1:
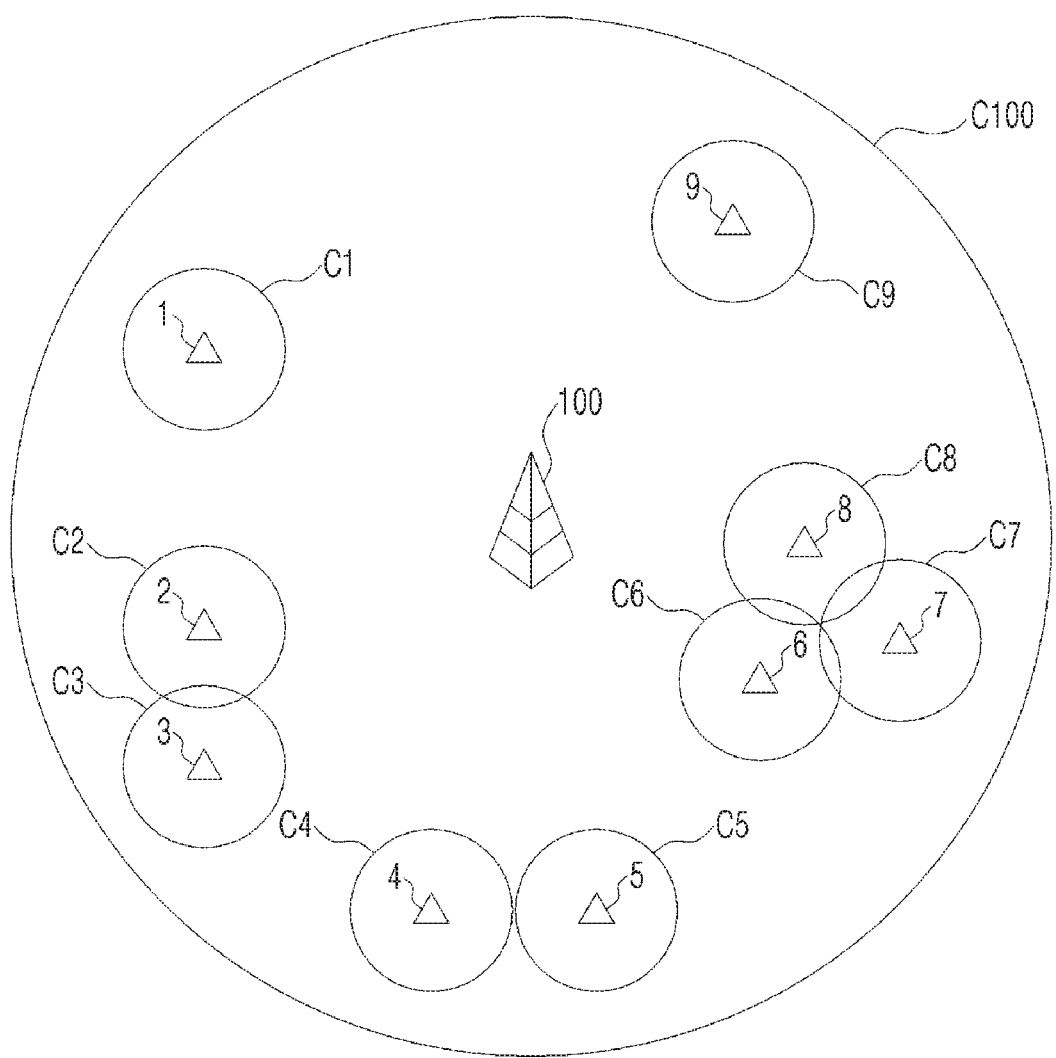
FIG. 1 is a configuration diagram illustrating a communication system environment to which the present invention is applied.

FIG. 1 is a diagram illustrating a communication system environment to which the present invention is applied.

As illustrated in FIG. 1, in the communication system, two or more cells are formed adjacent to each other.

Further, the communication system illustrated in FIG. 1 may be applied to a heterogeneous network environment in which various base stations forming cells having different sizes, that is, a macro base station 100 forming a macro cell C100 and small base stations 1 to 9 forming cells C1 to C9 included in the cell coverage C100 of the macro base station 100 coexist in the same region.

In the heterogeneous network environment, a plurality of macro base stations including the macro base station 100 may exist, and at least one small base station may exist in a cell of each macro base station, like the small base stations 1 to 9 in the cell C100 of the macro base station 100. Further, one base station may also form a plurality of cells.

However, for convenience of explanation, hereinafter, explanation will be made by describing one macro base station 100 and the small base stations 1 to 9 existing in the cell C100 of the macro base station 100 as in FIG. 1. Further, explanation will be made by describing that each base station, that is, each of the macro base station 100 and the small base stations 1 to 9 form one cell.

Therefore, a base station and a cell formed by the base station may be regarded as the same. Thus, in the following description, for convenience of explanation, the macro base station 100 and the macro cell C100 will be used interchangeably, and each of the base stations 1 to 9 and each of the small cells C1 to C9 will be used interchangeably.

In the heterogeneous network environment, the macro base station 100 and the small base stations 1 to 9 may use coordinated multi point (CoMP) technology.

The coordinated multi point technology (hereinafter, referred to as CoMP technology) is a technology in which two or more base stations perform coordinated transmission and reception with respect to a terminal suffering from high intercell interference or a (user) terminal located at a cell edge for improving transmission and reception performance of the terminal. A purpose of the CoMP technology is to improve performance of the terminal having poor transmission and reception performance.

Among CoMP technologies, there is a CoMP technology using the concept of virtual cell (hereinafter, referred to as virtual cell CoMP technology).

The virtual cell CoMP technology is a technology in which the same physical cell identifier (PCI) may be assigned to two or more adjacent cells to form one virtual cell and thus, interference at a cell edge may be improved and a terminal may move without inter-cell handover in one virtual cell.

Describing the virtual cell CoMP technology in detail, in the LTE-A communication system, the CSI-RS and the DMRS supported in specific specification, for example, TM-9 and TM-10 are utilized, such that the same physical cell identifier (PCI) may be assigned to two or more adjacent cells, for example, the cells C2 and C3 in FIG. 1 to form one virtual cell V_C (C2+C3). As such, when the virtual cell V_C (C2+C3) is formed, interference at the cell edge between the cells C2 and C3 is improved, in addition, a terminal may move without handover between the cells C2 and C3 in one virtual cell V_C.

That is, in the LTE-A communication system, the same physical cell identifier (PCI) is assigned to the cells C2 and C3 to form one virtual cell V_C. Therefore, in a case of a terminal located in an overlapped area in which the cells C2 and C3 are overlapped with each other, the cells C2 and C3 each allocate the same radio resource to the terminal, such that the terminal is provided with the same communication service through each of the cells C2 and C3 at the same time.

Hereinafter, for convenience of explanation, a mode in which a base station in the LTE-A communication system provides the same communication service to a terminal through two or more cells, for example, both of the cells C2 and C3 at the same time, will be referred to as a virtual cell management mode.

Meanwhile, in the LTE-A communication system, regarding terminals each located in a central area of each of the cells C2 and C3, not the overlapped area, each of the cells C2 and C3 allocates separate radio resource to the terminals as in the related art, such that the terminals are provided with the communication service through the cells C2 and C3, respectively.

The present invention is applied to the environment (hereinafter, referred to as virtual cell environment) in which the same physical cell identifier (PCI) is assigned to two or more adjacent cells (e.g. C2 and C3) to form one virtual cell V_C (C2+C3).

Accordingly, it is premised that the terminal described in the present invention is a terminal of specific specification, for example, TM-9 terminal or TM-10 terminal, capable of using communication services in the virtual cell environment in which the virtual cell V_C is formed by the support of the above described specific specification, e.g. TM-9 or TM-10.

However, in the virtual cell environment, the interference at the cell edge may be improved but the effect of enhancing the operation efficiency of radio resources resulting from the frequency reuse may be deteriorated, that is, a tradeoff occurs.

In particular, in the heterogeneous network environment, since the small cells are newly installed and placed irregularly as needed, severe tradeoff may occur depending on environmental factors (e.g. the number of small cells, a distance between cells, an amount of traffic, etc.) of the small cells when the virtual cell is managed with respect to the small cells.

Accordingly, the present invention suggests a method for harmoniously satisfying the effect of improving intercell interference and enhancing the operation efficiency of radio resources in managing virtual cells in a heterogeneous network environment, and specifically, the method is intended to be implemented through a cell management apparatus.

Figure 2:
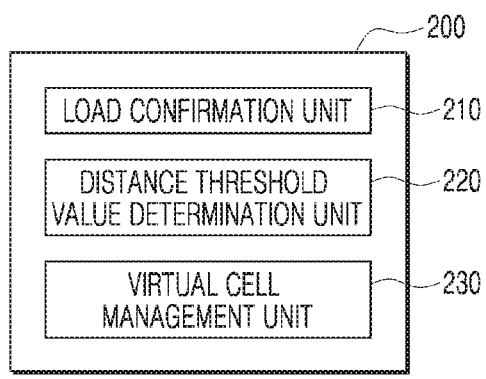
FIG. 2 is a block diagram illustrating a configuration of a cell management apparatus according to an exemplary embodiment of the present invention.

Hereinafter, a configuration of the cell management apparatus according to an exemplary embodiment of the present invention will be described in detail with reference to FIG. 2.

The cell management apparatus 200 according to an exemplary embodiment of the present invention includes a load confirmation unit 210 confirming overall load associated with a plurality of cells, a distance threshold value determination unit 220 determining a distance threshold value of a distance between cells in a virtual cell to be different based on the overall load, and a virtual cell management unit 230 managing two or more cells of which a distance therebetween satisfies the distance threshold value among the plurality of cells as one virtual cell, by using the determined distance threshold value.

Here, the plurality of cells means cells that may be managed as a virtual cell by the cell management apparatus 200 of the present invention.

As described above, according to the exemplary embodiment of the present invention applied to the heterogeneous network environment where cells having different sizes coexist, the plurality of cells may be, for example, the small cells C1 to C9 illustrated in FIG. 1.

Hereinafter, for convenience of explanation, as the plurality of cells, the small cells C1 to C9 will be described.

The load confirmation unit 210 confirms overall load associated with the plurality of cells, that is, the small cells C1 to C9.

Describing a more specific exemplary embodiment, the macro base station 100 and the small base stations 1 to 9 may be connected to each other through a separate backhaul.

Alternately, considering a base station system having a structure in which a baseband unit (BU) managing radio resources and a remote radio unit (RU) in charge of physical signal transmission and reception are separated, each of the macro base station 100 and the small base stations 1 to 9 may correspond to the RU managed by one BU. In this case, the macro base station 100 and the small base stations 1 to 9 of the present invention may be connected to each other by one BU without a separate backhaul.

The cell management apparatus 200 of the present invention may collect information (hereinafter, referred to as small cell environment information) associated with environmental factors of the small cell through the connection relationship by the above described backhaul or the BU.

The cell management apparatus 200 of the present invention may also collect the small cell environment information by being directly connected to each of the small base stations 1 to 9, but not through the connection relationship by the above described backhaul or the BU.

In this case, the small cell environment information may include the number of small cells, a distance between each small cell and the other small cell, an amount of traffic of each small cell, measurement information (e.g. signal-to-interference-plus-noise ratio (SINR), reference signal received power (RSRP), etc.) for each location measured by each terminal, throughput (UE throughput) of each terminal using the communication service through virtual cells, modulation and coding scheme (MCS) level, or the like.

The small cell environment information may also be information provided from a small base station of each small cell periodically or when a specific event occurs, and/or information managed by a manager.

Referring to FIG. 1, the cell management apparatus 200 of the present invention may collect the small cell environment information including the number of small cells (e.g. 9) included in the macro cell C100, a distance between each small cell (C1 to C9) and the other small cell, an amount of traffic of each of the small cells C1 to C9, measurement information (e.g. SINR, RSRP, etc.) for each location in the macro cell C100 measured by each terminal, throughput of each terminal that has used the communication service through virtual cells, MCS level, or the like The load confirmation unit 210 may confirm overall load associated with the small cells C1 to C9 based on the small cell environment information collected as described above.

Here, the overall load may be confirmed to be different according to at least one of the total amount of traffic accommodated in the plurality of cells (i.e. the small cells C1 to C9), and the total number of the plurality of cells (i.e. the small cells C1 to C9).

For example, the load confirmation unit 210 may confirm the total amount of traffic obtained by summing up the amounts of traffic of respective small cells C1 to C9 based on the small cell environment information collected as described above.

Meanwhile, the load confirmation unit 210 may confirm the total number of small cells C1 to C9, that is, the number (e.g. 9) of small cells included in the macro cell C100, based on the small cell environment information collected as described above.

The load confirmation unit 210 confirms the overall load that is different according to at least one of the total amount of traffic accommodated in the small cells C1 to C9 and the number of small cells (e.g. 9).

It may be considered that this results from the fact that it may be regarded that the larger the amount of traffic accommodated in the small base station, that is, the small cell, the larger the load, and the smaller the amount of traffic, the smaller the load, and it is predicted that the load is larger in a region of the macro cell including the larger number of small cells, since the number of small cells disposed is generally large in the region in which the amount of traffic is large.

Therefore, it will be confirmed that the larger the total amount of traffic accommodated in the small cells C1 to C9 and the number (e.g. 9) of small cells, the larger the value of the overall load confirmed in the load confirmation unit 210.

The distance threshold value determination unit 220 determines a distance threshold value η of a distance between cells in a virtual cell to be different based on the overall load confirmed in the load confirmation unit 210.

Here, it is preferable that the distance threshold value η is determined so that the larger the overall load, the smaller the distance threshold value η, and the smaller the overall load, the larger the distance threshold value η.

The reason is that, in terms of the overall throughput of the system, it is preferred to place relatively more emphasis on the effect of enhancing the operation efficiency of radio resources among the effect of improving the intercell interference and the effect of enhancing the operation efficiency of radio resources (that is, the tradeoff occurring in managing virtual cells), when the overall load applied to the entire small cells C1 to C9 is large.

Further, in terms of the overall throughput of the system, it is preferred to place relatively more emphasis on the effect of improving the intercell interference among the effect of improving the intercell interference and the effect of enhancing the operation efficiency of radio resources (that is, the tradeoff occurring in managing virtual cells), when the overall load applied to the entire small cells C1 to C9 is small.

The virtual cell management unit 230 manages two or more cells of which a distance therebetween satisfies the distance threshold value η, among the plurality of cells, that is, the small cells C1 to C9, as one virtual cell, by using the distance threshold value determined in the distance threshold value determination unit 220.

In other words, the virtual cell management unit 230 manages, among the small cells C1 to C9, two or more cells as one virtual cell, two or more cells of which a distance therebetween satisfies a distance threshold value η that is flexible depending on the overall load, that is, the distance threshold value η determined to be small when the overall load is large, and determined to be large when the overall load is small.

Therefore, according to the cell management apparatus 200 of the present invention, in the small cells C1 to C9, when the overall load is large, the large number of virtual cells are managed, and when the over all load is small, the small number of virtual cells are managed, such that only the appropriate number of virtual cells capable of harmoniously satisfying the effects of improving the intercell interference and enhancing the operation efficiency of radio resources may be managed based on the overall load.

Further, the virtual cell management unit 230 may also be operated according to different virtual cell management method based on the overall load confirmed in the load confirmation unit 210 to manage two or more cells of which a distance therebetween satisfies the distance threshold value η, among the plurality of cells, that is, the small cells C1 to C9, as one virtual cell.

Describing in more detail, the virtual cell management unit 230 may be operated according to different virtual cell management method based on the overall load confirmed in the load confirmation unit 210.

For example, the virtual cell management method may be divided into a first virtual cell management method used when the overall load is a preset reference value or more, and a second virtual cell management method used when the overall load is less than the reference value.

The virtual cell management unit 230 may be operated by the first virtual cell management method when the overall load confirmed in the load confirmation unit 210 is the reference value or more to manage two or more cells of which a distance therebetween satisfies the distance threshold value η, among the small cells C1 to C9, as one virtual cell according to the first virtual cell management method.

Meanwhile, the virtual cell management unit 230 may be operated by the second virtual cell management method when the overall load confirmed in the load confirmation unit 210 is less than the reference value to manage two or more cells of which a distance therebetween satisfies the distance threshold value η, among the small cells C1 to C9, as one virtual cell according to the second virtual cell management method.

In this case, the first virtual cell management method is a method in which a small cell to be managed as a virtual cell is selected based on a real time amount of traffic or the latest amount of traffic of each small cell, and the selected small cell is managed as the virtual cell.

Hereinafter, a case in which the virtual cell management unit 230 is operated according to the first virtual cell management method will be described in detail.

When operated according to the first virtual cell management method, the virtual cell management unit 230 confirms priority based on the amount of traffic with respect to the plurality of cells, that is, the small cells C1 to C9, respectively.

That is, the virtual cell management unit 230 may confirm the real time amount of traffic or the latest amount of traffic of each of the small cells C1 to C9 based on the small cell environment information collected as described above, and may confirm (update) priority with respect to the small cells C1 to C9, respectively, based on the amount of traffic of each of the small cells C1 to C9.

In this case, among the small cells C1 to C9, a small cell of which an amount of traffic is small has high priority and a small cell of which an amount of traffic is large has low priority.

As such, after the priority with respect to the small cells C1 to C9 are confirmed, the virtual cell management unit 230 sequentially selects the small cell in an order from the small cell having the highest priority to the small cell having the lowest priority among the small cells C1 to C9.

Further, when at least one small cell of which a distance from the selected small cell is within the distance threshold value $\eta$ exists, the virtual cell management unit 230 manages the selected cell and the at least one cell as one virtual cell.

For example, it is assumed that the priority with respect to the small cells C1 to C9 is as shown in Table 1 below.

TABLE 1

| Small Cell | C1 | C2 | C3 | C4 | C5 | C6 | C7 | C8 | C9 |
|---|---|---|---|---|---|---|---|---|---|
| Priority | 3 | 1 | 2 | 4 | 5 | 6 | 7 | 8 | 9 |

The virtual cell management unit 230 selects the small cell having the highest priority among small cells that are not assigned with a physical cell identifier (PCI).

In a state in which there is no small cell assigned with a physical cell identifier (PCI) in the small cells C1 to C9, the virtual cell management unit 230 will select the top priority small cell C2 having the highest priority.

Thereafter, the virtual cell management unit 230 determines whether a small cell of which a distance from the selected small cell C2 is within the distance threshold value $\eta$ exists.

For example, the virtual cell management unit 230 may determine whether a small cell of which a distance from the small cell C2 is within the distance threshold value $\eta$ exists on the basis of the distance between the small cell C2 and the other small cell that may be confirmed based on the small cell environment information collected as described above.

If it is determined that a small cell (e.g. C3) of which a distance from the small cell C2 is within the distance threshold value $\eta$ exists, the virtual cell management unit 230 may assign the same physical cell identifier (PCI) to the small cells C2 and C3 to manage the small cells C2 and C3 as one virtual cell V_C.

Meanwhile, if it is determined that a small cell of which a distance from the small cell C2 is within the distance threshold value $\eta$ does not exist, the virtual cell management unit 230 may assign an individual physical cell identifier (PCI) to the small cell C2 to manage the small cell C2 as a normal small cell C2.

Thereafter, the virtual cell management unit 230 selects the small cell having the highest priority among the small cells that are not assigned with a physical cell identifier (PCI).

For example, in a case in which the small cells C2 and C3 are assigned with the same physical cell identifier (PCI) and managed as one virtual cell V_C as described above, the virtual cell management unit 230 will select the small cell C1 having the highest priority among the small cells C1 and C4 to C9 that are not assigned with a physical cell identifier (PCI).

Meanwhile, in a case in which the small cell C2 is assigned with an individual physical cell identifier (PCI) and managed as a normal small cell C2 as described above, the virtual cell management unit 230 will select the small cell C3 having the highest priority among the small cells C1 and C3 to C9 that are not assigned with a physical cell identifier (PCI).

Describing the case in which the small cells C2 and C3 are managed as one virtual cell V_C and thus the small cell C1 is selected, if a small cell of which a distance from the small cell C1 is within the distance threshold value $\eta$ exists, the virtual cell management unit 230 will manage the small cell C1 and the small cell of which the distance from the small cell C1 is within the distance threshold value $\eta$ as one virtual cell, like the small cell C2 described above.

Further, the virtual cell management unit 230 will repeat an operation of selecting a small cell having the highest priority among the small cells that are not assigned with a physical cell identifier (PCI) and managing the selected small cell and a small cell of which the distance from the selected small cell is within the distance threshold value $\eta$ as one virtual cell until there is no small cell that is not assigned with the physical cell identifier (PCI) left in the small cells C1 to C9.

Meanwhile, the second virtual cell management method is a method in which whether to manage each cell group as a virtual cell is determined by using information on grouping of small cells that may be managed as a virtual cell.

Hereinafter, a case in which the virtual cell management unit 230 is operated according to the second virtual cell management method will be described in detail.

When operated according to the second virtual cell management method, the virtual cell management unit 230 confirms at least one cell group that is formed in advance from the plurality of cells, that is, the small cells C1 to C9.

Here, the at least one cell group may be formed in advance from the plurality of cells, that is, the small cells C1 to C9 according to a predefined virtual cell grouping policy to be managed as a virtual cell.

For example, describing in more detail, the virtual cell grouping policy may include a first policy in which each cell group that may be managed as a virtual cell is formed based on a distance between each small cell and the other small cell, a second policy in which each cell group that may be managed as a virtual cell is formed based on the distance between each small cell and the other small cell and measurement information (e.g. SINR, RSRP, etc.) for each location measured by each terminal, and a third policy in which each cell group that may be managed as a virtual cell is formed based on modulation and coding scheme (MCS) level or throughput (UE throughput) for each terminal using the communication service through virtual cells.

That is, describing a case according to the first policy, the virtual cell management unit 230 may confirm a distance between each of the small cells C1 to C9 and the other small cell based on the small cell environment information collected as described above.

The virtual cell management unit 230 may group small cells of which a distance therebetween is within a preset grouping distance among the small cells C1 to C9, into one group.

Meanwhile, describing a case according to the second policy, the virtual cell management unit 230 may confirm the distance between each of the small cells C1 to C9 and the other small cell and the measurement information (e.g. SINR, RSRP, etc.) mapped to each location in the macro cell C100, based on the small cell environment information collected as described above.

The virtual cell management unit 230 may group small cells of which a distance therebetween is within the preset grouping distance and the measurement information (e.g.

SINR, RSRP, etc.) at the relevant location satisfies a preset grouping measurement value, among the small cells C1 to C9, into one group.

Meanwhile, describing a case according to the third policy, the virtual cell management unit 230 may confirm the distance between each of the small cells C1 to C9 and the other small cell and the MCS level or the throughput of the terminal in the case of using virtual cells based on the small cell environment information collected as described above.

The virtual cell management unit 230 may group small cells of which a distance therebetween is within the preset grouping distance and the MCS level or the throughput for each terminal that has used the communication service through virtual cells is highest, among the small cells C1 to C9, into one group.

However, small cells that are most appropriate to be managed as a virtual cell among the small cells C1 to C9 may be grouped into a group in advance by applying various criteria in addition to the above described first to third policies.

Further, the virtual cell management unit 230 may update each cell group periodically or by a control of a manager, or when a small cell is newly installed in or removed from the macro cell C100, or when an on/off state of a small cell in the macro cell C100 is changed, by performing the above described grouping process again with respect to the small cells C1 to C9, Hereinafter, for convenience of explanation, description will be provided under the assumption that the small cells are grouped in advance as shown in Table 2 below.

TABLE 2

| Small Cell Group | Small Cell | Physical Cell Identifier/Management Mode | Distance Between Cells In Cell Group |
|---|---|---|---|
| — | C1 | PCI 1/Normal Cell | — |
| — | C9 | PCI 9/Normal Cell | — |
| Group 1 | C2 | PCI 2/Virtual Cell | 17 |
| | C3 | PCI 2/Virtual Cell | |
| Group 2 | C6 | PCI 6/Virtual Cell | 15 |
| | C7 | PCI 6/Virtual Cell | |
| | C8 | PCI 6/Virtual Cell | |
| Group 3 | C4 | PCI 4/Normal Cell | 25 |
| | C5 | PCI 5/Normal Cell | |

Here, it is preferable that a distance between cells in a cell group means the longest distance among distances between cells in each cell group.

When operated according to the second virtual cell management method, the virtual cell management unit 230 confirms at least one cell group that is formed in advance from the plurality of cells, that is, the small cells C1 to C9 as described above.

As assumed in Table 2 above, the virtual cell management unit 230 may confirm one or more cell groups 1 to 3 that are formed in advance from the small cells C1 to C9.

As such, after confirming the cell groups 1 to 3, the virtual cell management unit 230 determines whether a specific cell group in which a distance between small cells is within the distance threshold value η exists in the cell groups 1 to 3.

For example, if the predetermined distance threshold value η is 20 m, the virtual cell management unit 230 may determine that the cell groups 1 and 2 exist as the specific cell group in which distance between small cells is within the distance threshold value η (20 m) in the cell groups 1 to 3.

As such, when it is determined that the specific cell group exists, the virtual cell management unit 230 may manage the small cells in the specific cell group, that is, each of the cell groups 1 and 2, as one virtual cell.

That is, the virtual cell management unit 230 may assign the same physical cell identifier (e.g. PCI 2) to the small cells in the cell group 1, that is, the small cells C2 and C3 to manage the small cells C2 and C3 as one virtual cell V_C, and assign the same physical cell identifier (e.g. PCI 6) to the small cells in the cell group 2, that is, the small cells C6, C7, and C8 to manage the small cells C6, C7, and C8 as one virtual cell V_C.

Meanwhile, in a case of the cell group 3 in which distance between small cells is not within the distance threshold value η (20 m), the virtual cell management unit 230 assigns different physical cell identifiers (e.g. PCI 4 and 5) to each of the small cells C4 and C5 in the cell group 3 to manage the small cells C4 and C5 as normal small cells C4 and C5. Further, the virtual cell management unit 230 will also assign individual physical cell identifiers (e.g. PCI 1 and 9) to the respective remaining small cells C1 and C9 that are not grouped into a cell group to manage the small cells C1 and C9 as normal small cells.

As can be appreciated from the above description, the first virtual cell management method is a method in which a small cell to be managed as a virtual cell is selected based on a real time amount of traffic or the latest amount of traffic of each small cell to determine whether to manage the small cell as a virtual cell, and the second virtual cell management method is a method in which whether to manage each cell group as a virtual cell is determined by using information on advance grouping of small cells that may be managed as a virtual cell.

Therefore, in a case in which the first virtual cell management method suggested in the present invention is used, there is a disadvantage that an amount of traffic of each small cell needs to be frequently measured, however, it is possible to most accurately reflect the amount of traffic changed every second. Therefore, although complexity of the system in determining whether to manage cells as a virtual cell is increased as compared to the second virtual cell management method, the effect of enhancing the overall throughput of the system will be significant.

Meanwhile, in a case in which the second virtual cell management method suggested in the present invention is used, since the information on grouping of the small cells that are expected (determined) to be statistically excellent based on various criteria is used, although the overall throughput of the system may be somewhat deteriorated as compared to the first virtual cell management method, the complexity of the system in determining whether to manage cells as a virtual cell will be decreased.

Therefore, as described above, the foregoing first virtual cell management method and second virtual cell management method are proposed, and when the overall load is the reference value or more, the cell management apparatus 200 of the present invention is operated according to the first virtual cell management method by which relatively excellent throughput of the system may be obtained, and when the overall load is less than the reference value, the cell management apparatus 200 is operated according to the second virtual cell management method by which the relatively low complexity of the system may be obtained, thereby appropriately obtaining the characteristic effects of the first and second virtual cell management methods.

As described above, the cell management apparatus 200 of the present invention is operated in an appropriate virtual cell management mode (first or second virtual cell management mode) depending on whether the overall load (the total amount of traffic and the number of small cells) of the small cells C1 to C9 is the reference value or more or less than the reference value, and manages the virtual cell by appropriately considering an amount of traffic of each small cell, a distance between cells, and the like according to the (first or second) virtual cell management mode based on the distance threshold value η determined to be different based on the overall load, thereby managing the virtual cell while optimally reflecting the environmental factors of the small cell (e.g. the number of small cells, a distance between cells, an amount of traffic, etc.).

Therefore, the cell management apparatus 200 of the present invention is capable of harmoniously satisfying the effects of improving intercell interference and enhancing the operation efficiency of radio resources in managing virtual cells, particularly in managing virtual cells in a heterogeneous network environment in which cells having different sizes coexist.

Figure 3:
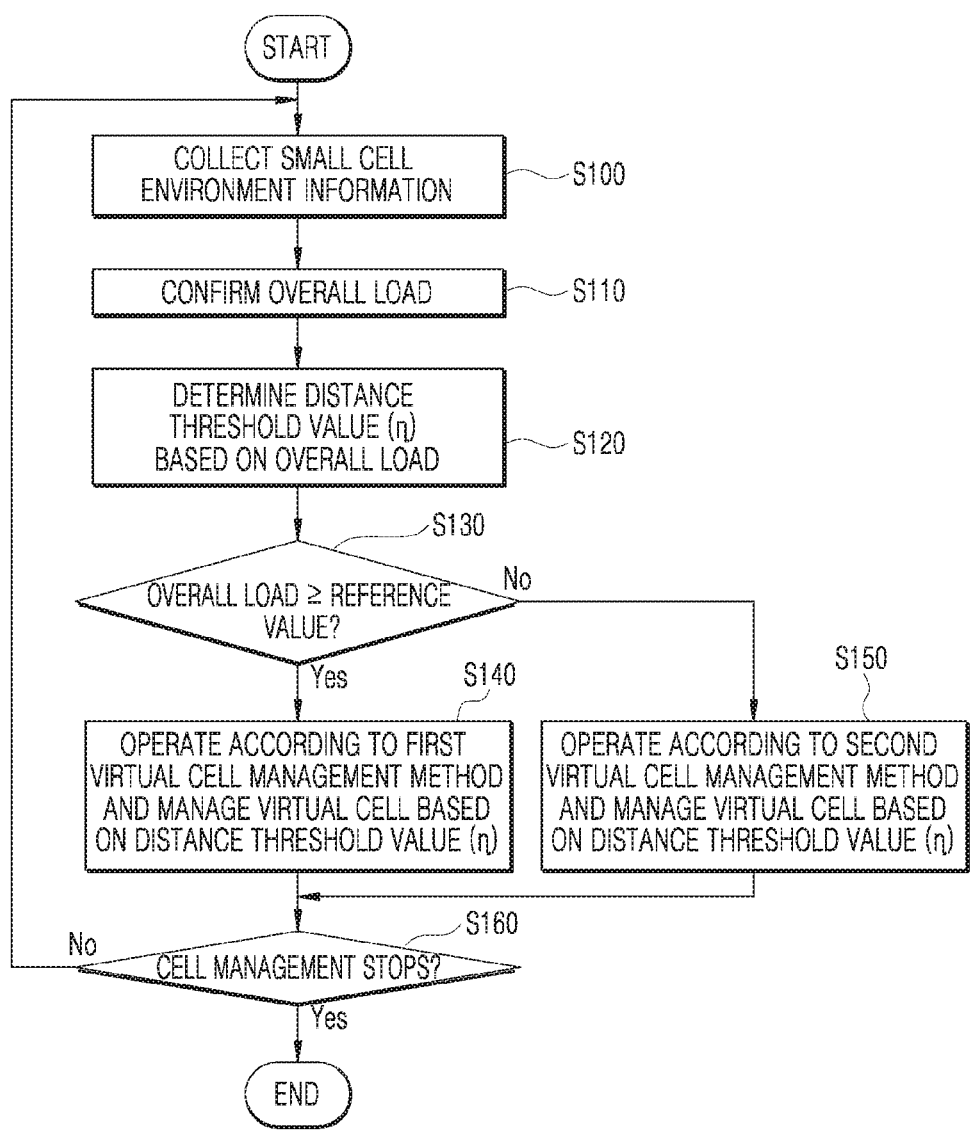
Figure 4:
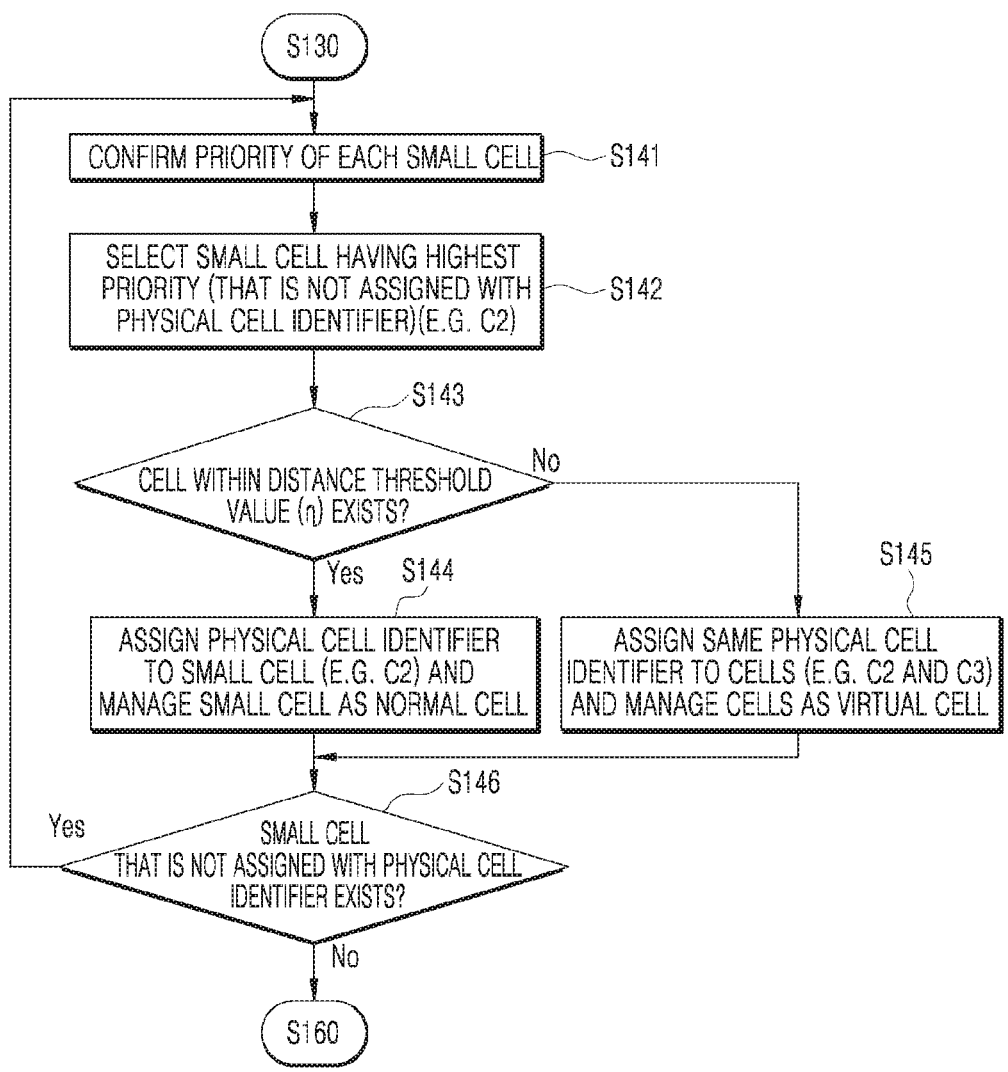

Hereinafter, a method for operating a cell management apparatus according to an exemplary embodiment of the present invention will be described with reference to FIGS. 3 to 5. For convenience of explanation, description will be made by using the above described reference numerals in FIGS. 1 and 2.

First, a method for operating a cell management apparatus according to an exemplary embodiment of the present invention will be described as follows with reference to FIG. 3.

In the method for operating a cell management apparatus according to an exemplary embodiment of the present invention, small cell environment information is collected (S100).

Hereinafter, for convenience of explanation, description will be made by referring to the above described exemplary embodiment referring to FIG. 1.

That is, in the method for operating a cell management apparatus according to an exemplary embodiment of the present invention, the small cell environment information including the number of small cells (e.g. 9) included in the macro cell C100, a distance between each small cell (C1 to C9) and the other small cell, an amount of traffic of each of the small cells C1 to C9, measurement information (e.g. SINR, RSRP, etc) for each location in the macro cell C100 measured by each terminal, throughput of each terminal that has used the communication service through virtual cells, modulation and coding scheme (MCS) level, or the like, may be collected.

In the method for operating a cell management apparatus according to an exemplary embodiment of the present invention, overall load associated with the small cells C1 to C9 may be confirmed based on the small cell environment information collected as described above (S110).

Here, the overall load may be confirmed to be different according to at least one of the total amount of traffic accommodated in a plurality of cells (i.e. the small cells C1 to C9), and the total number of a plurality of cells (i.e. the small cells C1 to C9).

Thereafter, in the method for operating a cell management apparatus according to an exemplary embodiment of the present invention, a distance threshold value η of a distance between cells in a virtual cell is determined to be different based on the overall load confirmed in step S110 (S120).

The method for operating a cell management apparatus according to an exemplary embodiment of the present invention may be operated by the first virtual cell management method when the overall load confirmed in step S110 is the reference value or more (S130, Yes) to manage two or more cells of which a distance therebetween satisfies the distance threshold value η, among the small cells C1 to C9, as one virtual cell according to the first virtual cell management method (S140).

In this case, the first virtual cell management method is a method in which a small cell to be managed as a virtual cell is selected based on a real time amount of traffic or the latest amount of traffic of each small cell, and the selected small cell is managed as the virtual cell.

Meanwhile, in the method for operating a cell management apparatus according to an exemplary embodiment of the present invention, the cell management apparatus may be operated by the second virtual cell management method when the overall load confirmed in step S110 is less than the reference value (S130, No) to manage two or more cells of which a distance between cells satisfies the distance threshold value η, among the small cells C1 to C9, as one virtual cell according to the second virtual cell management method (S150).

Here, the second virtual cell management method is a method in which whether to manage each cell group as a virtual cell is determined by using information on advance grouping of small cells that may be managed as a virtual cell.

In the method for operating a cell management apparatus according to an exemplary embodiment of the present invention, the foregoing step S100 and the subsequent steps thereafter will be repeatedly performed continuously as needed, unless the cell management function stops (S160, No).

Hereinafter, step S140 in the method for operating a cell management apparatus according to an exemplary embodiment of the present invention, that is, the process in which the cell management apparatus is operated according to the first virtual cell management method will be described in detail with reference to FIG. 4.

In the method for operating a cell management apparatus according to an exemplary embodiment of the present invention, when operated according to the first virtual cell management method (S130, Yes), priority based on an amount of traffic is confirmed with respect to each of the plurality of cells, that is, the small cells C1 to C9 (S141).

That is, in the method for operating a cell management apparatus according to an exemplary embodiment of the present invention, an amount of traffic of each of the small cells C1 to C9 may be confirmed based on the small cell environment information collected as described above, and the priority with respect to each of the small cells C1 to C9 may be confirmed (updated) based on the amount of traffic of each of the small cells C1 to C9.

In this case, among the small cells C1 to C9, a small cell of which an amount of traffic is small has high priority and a small cell of which an amount of traffic is large has low priority.

As such, in the method for operating a cell management apparatus according to an exemplary embodiment of the present invention, after the priority with respect to each of the small cells C1 to C9 is confirmed, a small cell is sequentially selected in an order from a small cell having the highest priority to a small cell having the lowest priority among the small cells C1 to C9. Further, in the method for operating a cell management apparatus according to an exemplary embodiment of the present invention, when at least one small cell of which a distance from the selected small cell is within the distance threshold value η exists, the selected cell and the at least one cell are managed as one virtual cell.

Detailed description will be made under the assumption that the priority with respect to each of the small cells C1 to C9 is as shown in Table 1 above, by way of example.

In the method for operating a cell management apparatus according to an exemplary embodiment of the present invention, after the priority with respect to each of the small cells C1 to C9 is confirmed, the small cell having the highest priority is selected among the small cells that are not assigned with a physical cell identifier (PCI) (S142).

In the method for operating a cell management apparatus according to an exemplary embodiment of the present invention, in a state in which there is no small cell assigned with a physical cell identifier (PCI) in the small cells C1 to C9, the top priority small cell C2 having the highest priority will be selected.

Thereafter, in the method for operating a cell management apparatus according to an exemplary embodiment of the present invention, it is determined whether a small cell of which a distance from the selected small cell C2 is within the distance threshold value η exists (S143).

For example, in the method for operating a cell management apparatus according to an exemplary embodiment of the present invention, it may be determined whether a small cell of which a distance from the small cell C2 is within the distance threshold value η exists on the basis of a distance between the small cell C2 and the other small cell that may be confirmed based on the small cell environment information collected as described above.

In the method for operating a cell management apparatus according to an exemplary embodiment of the present invention, if it is determined that a small cell (e.g. C3) of which a distance from the small cell C2 is within the distance threshold value η exists (S143, Yes), the same physical cell identifier (PCI) may be assigned to the small cells C2 and C3 to manage the small cells C2 and C3 as one virtual cell V_C (S145).

Meanwhile, in the method for operating a cell management apparatus according to an exemplary embodiment of the present invention, if it is determined that a small cell of which a distance from the small cell C2 is within the distance threshold value η does not exist (S143, No), an individual physical cell identifier (PCI) may be assigned to the small cell C2 to manage the small cell C2 as a normal small cell C2 (S144).

Thereafter, in the method for operating a cell management apparatus according to an exemplary embodiment of the present invention, it is confirmed whether a small cell that is not assigned with a physical cell identifier (PCI) exists in the small cells C1 to C9 (S146).

In the method for operating a cell management apparatus according to an exemplary embodiment of the present invention, as long as a small cell that is not assigned with a physical cell identifier (PCI) exists in the small cells C1 to C9 (S146, Yes), the cell management apparatus enters step S142 in which the small cell having the highest priority is selected from the above described small cells to which a physical cell identifier (PCI) is not assigned, and performs the subsequent processes, repeatedly.

Hereinafter, step S150 in the method for operating a cell management apparatus according to an exemplary embodiment of the present invention, that is, the process in which the cell management apparatus is operated according to the second virtual cell management method will be described in detail with reference to FIG. 5.

In the method for operating a cell management apparatus according to an exemplary embodiment of the present invention, when operated according to the second virtual cell management method (S130, No), at least one cell group that is formed in advance from the plurality of cells, that is, the small cells C1 to C9, is confirmed (S152).

Hereinafter, description will be provided under the assumption that the small cells are grouped in advance as shown in Table 2 above.

As assumed in Table 2 above, in the method for operating a cell management apparatus according to an exemplary embodiment of the present invention, one or more cell groups 1 to 3 that are formed in advance from the small cells C1 to C9 may be confirmed.

As such, in the method for operating a cell management apparatus according to an exemplary embodiment of the present invention, after confirming the cell groups 1 to 3, it is determined whether a specific cell group in which a distance between small cells is within the distance threshold value η exists in the cell groups 1 to 3 (S154).

For example, in the method for operating a cell management apparatus according to an exemplary embodiment of the present invention, if the predetermined distance threshold value η is 20 m, it may be determined that the cell groups 1 and 2 exist as the specific cell group in which the distance between small cells is within the distance threshold value η (20 m) in the cell groups 1 to 3 (S154, Yes).

As such, in the method for operating a cell management apparatus according to an exemplary embodiment of the present invention, when it is determined that the specific cell group exists, the small cells in the specific cell group, that is, each of the cell groups 1 and 2 may be managed as one virtual cell.

That is, in the method for operating a cell management apparatus according to an exemplary embodiment of the present invention, the same physical cell identifier (e.g. PCI 2) may be assigned to the small cells in the cell group 1, that is, the small cells C2 and C3 to manage the small cells C2 and C3 as one virtual cell V_C, and the same physical cell identifier (e.g. PCI 6) may be assigned to the small cells in the cell group 2, that is, the small cells C6, C7, and C8 to manage the small cells C6, C7, and C8 as one virtual cell V_C (S156).

Meanwhile, in the method for operating a cell management apparatus according to an exemplary embodiment of the present invention, in the case of the cell group 3 in which a distance between small cells is not within the distance threshold value η (20 m) (S154, No), different physical cell identifiers (e.g. PCI 4 and 5) will be assigned to each of the small cells C4 and C5 in the cell group 3 to manage the small cells C4 and C5 as normal small cells C4 and C5 (S158).

Further, in the method for operating a cell management apparatus according to an exemplary embodiment of the present invention, individual physical cell identifiers (e.g. PCI 1 and 9) will be assigned to the respective remaining small cells C1 and C9 that are not grouped into a cell group, as well, to manage the small cells C1 and C9 as normal small cells C1 and C9.

As described above, in the method for operating a cell management apparatus according to an exemplary embodiment of the present invention, the foregoing first virtual cell management method and second virtual cell management method are proposed, and when the overall load is the reference value or more, the method for operating a cell management apparatus is operated according to the first virtual cell management method by which relatively excellent throughput of the system may be obtained, and when the overall load is less than the reference value, the cell management apparatus is operated according to the second virtual cell management method by which the relatively low complexity of the system may be obtained, thereby appropriately obtaining the characteristic effects of the first and second virtual cell management methods.

As described above, in the method for operating a cell management apparatus according to an exemplary embodiment of the present invention, the cell management apparatus may be operated in an appropriate virtual cell management mode (first or second virtual cell management mode) depending on whether the overall load (the total amount of traffic and the number of small cells) of the small cells C1 to C9 is the reference value or more or less than the reference value, and manages the virtual cell by appropriately considering the amount of traffic of each small cell, the a distance between cells, and the like according to the (first or second) virtual cell management mode based on the distance threshold value η determined to be different based on the overall load, thereby managing the virtual cell by optimally reflecting the environmental factors of the small cell (e.g. the number of small cells, a distance between cells, an amount of traffic, etc.).

Therefore, the method for operating a cell management apparatus according to an exemplary embodiment of the present invention is capable of harmoniously satisfying the effects of improving intercell interference and enhancing the operation efficiency of radio resources in managing virtual cells, particularly in managing virtual cells in a heterogeneous network environment in which cells having different sizes coexist.

The method for operating a cell management apparatus according to an exemplary embodiment of the present invention may be implemented as a program command that may be executed through various computer units and may be recorded in a computer-readable medium. The computer readable medium may include a program command, data file, data structure, or the like, alone or a combination thereof. The program command recorded in the computer-readable recording medium may be designed and constituted especially for the present invention, or may be known to those skilled in a field of computer software. Examples of the computer-readable recording medium may include a magnetic medium such as a hard disk, a floppy disk, and a magnetic tape; an optical recording medium such as a CD-ROM and a DVD; a magneto-optical medium such as a floptical disk; and a hardware device specially constituted to store and perform program commands such as a ROM, a RAM, a flash memory, or the like. Examples of the program commands may include machine language codes made by compilers as well as high-level language codes capable of being executed by computers using interpreters, or the like. The hardware device may be constituted to be operated as one or more software modules in order to perform the action according to the present invention, and vice versa.

Although the present invention has been described in detail with reference to the preferred exemplary embodiments, the present invention is not limited thereto, and those skilled in the art to which the present invention pertains will appreciate that various modifications, changes are possible, without departing from the scope and spirit of the present invention as disclosed in the accompanying claims.

The invention claimed is:

1. A cell management apparatus, comprising:
a load confirmation unit configured to confirm overall load associated with a plurality of cells;
a distance threshold value determination unit configured to
determine a distance threshold value for a virtual cell based on the overall load; and
a virtual cell management unit configured to
determine two or more cells of which a distance therebetween satisfies the distance threshold value among the plurality of cells by using the determined distance threshold value, and
manage the two or more cells to be as the virtual cell when the distance between the two or more cells satisfies the distance threshold value,
wherein
the virtual cell management unit is configured to
operate virtual cell management method differently determined based on the overall load, and
manage the two or more cells of which the distance therebetween satisfies the distance threshold value among the plurality of cells as the virtual cell, and
wherein the virtual cell management method includes a first virtual cell management method used when the overall load is a preset reference value or more, and a second virtual cell management method used when the overall load is less than the preset reference value.

2. The cell management apparatus of claim 1, wherein the distance threshold value is determined so that the smaller the overall load, the larger the distance threshold value.

3. The cell management apparatus of claim 1, wherein the overall load is confirmed to be different according to at least one of
a total amount of traffic in the plurality of cells, or
a total number of the plurality of cells.

4. The cell management apparatus of claim 1, wherein when the virtual cell management unit is operated according to the first virtual cell management method, the virtual cell management unit confirms priority based on an amount of traffic with respect to each of the plurality of cells, sequentially selects a cell in an order from a cell having the highest priority to a cell having the lowest priority among the plurality of cells, and determines whether to manage the selected cell as the virtual cell based on the distance threshold value.

5. The cell management apparatus of claim 4, wherein priority of the each of the plurality of cells is higher as the each of the plurality of cells has a smaller amount of traffic.

6. The cell management apparatus of claim 1, wherein when the virtual cell management unit is operated according to the second virtual cell management method, the virtual cell management unit confirms at least one cell group that is formed in advance from the plurality of cells, and when a specific cell group in which a distance between cells is within the distance threshold value exists in the at least one cell group, manages the cells in the specific cell group as the virtual cell.

7. The cell management apparatus of claim 6, wherein the at least one cell group is formed in advance from the plurality of cells according to a predefined virtual cell grouping policy to be managed as the virtual cell.

8. A method for operating a cell management apparatus, comprising:
a load confirmation step configured to confirm overall load associated with a plurality of cells;
a distance threshold value determination step configured to determine a distance threshold value for a virtual cell based on the overall load; and a virtual cell management step configured to determine two or more cells of which a distance therebetween satisfies the distance threshold value among the plurality of cells by using the determined distance threshold value, and manage the two or more cells to be as the virtual cell when the distance between the two or more cells satisfies the distance threshold value, wherein the virtual cell management step is performed according to different virtual cell management method based on the overall load to manage the two or more cells of which the distance therebetween satisfies the distance threshold value among the plurality of cells as the virtual cell, and wherein the virtual cell management method includes a first virtual cell management method used when the overall load is a preset reference value or more, and a second virtual cell management method used when the overall load is less than the preset reference value.

9. The method of claim 8, wherein the overall load is confirmed to be different according to at least one of a total amount of traffic in the plurality of cells, or a total number of the plurality of cells.

10. The method of claim 8, wherein when the virtual cell management step is performed according to the first virtual cell management method, the virtual cell management step is performed to confirm priority based on an amount of traffic with respect to each of the plurality of cells, sequentially selects a cell in an order from a cell having the highest priority to a cell having the lowest priority among the plurality of cells, and determines whether to manage the selected cell as the virtual cell based on the distance threshold value.

11. The method of claim 8, wherein when the virtual cell management step is performed according to the second virtual cell management method, when the virtual cell management step is performed to confirm at least one cell group that is formed in advance from the plurality of cells, and when a specific cell group in which a distance between cells is within the distance threshold value exists in the at least one cell group, manages the cells in the specific cell group as the virtual cell.

* * * * *